United States Patent [19]

Lalikos et al.

[11] 4,332,278
[45] Jun. 1, 1982

[54] BRAIDED-WIRE SHEATHING HAVING BUNDLED STRANDS TWISTED TO EQUALIZE TENSION

[75] Inventors: James M. Lalikos, Springfield; Harold K. Waite, East Longmeadow, both of Mass.

[73] Assignee: Titeflex Corporation, Springfield, Mass.

[21] Appl. No.: 63,798

[22] Filed: Aug. 6, 1979

Related U.S. Application Data

[60] Continuation of Ser. No. 861,264, Dec. 16, 1977, abandoned, which is a division of Ser. No. 676,940, Apr. 14, 1976, Pat. No. 4,092,897.

[51] Int. Cl.$^3$ ............................................... F16L 11/08
[52] U.S. Cl. ..................................... 138/127; 138/130; 138/138; 156/149
[58] Field of Search ............... 138/123, 124, 125, 126, 138/127, 130, 138; 156/149; 87/9; 57/212

[56] References Cited

U.S. PATENT DOCUMENTS

| | | | |
|---|---|---|---|
| 1,014,918 | 1/1912 | Subers | 138/126 X |
| 2,564,602 | 8/1951 | Hurst | 138/125 |
| 2,962,050 | 11/1960 | Ramberg et al. | 138/127 X |
| 3,011,525 | 12/1961 | Randle et al. | 138/126 |
| 3,060,973 | 10/1962 | Mlinar | 138/126 |
| 3,463,197 | 8/1969 | Slade | 138/125 |
| 3,481,368 | 12/1969 | Vansickle et al. | 138/125 |

Primary Examiner—James E. Bryant, III
Attorney, Agent, or Firm—Louis Bernat

[57] ABSTRACT

A braided-wire sheathing for high pressure hose or the like composed of interwoven bundles of high tensile strength wire. Within each bundle, the longer wires are twisted helically about the shorter wires such that all of the wires are under substantially equal tension. The interwoven bundles are grouped in pairs in a two-over, two-under pattern, the two bundles in each pair being twisted in opposing rotational directions.

3 Claims, 2 Drawing Figures

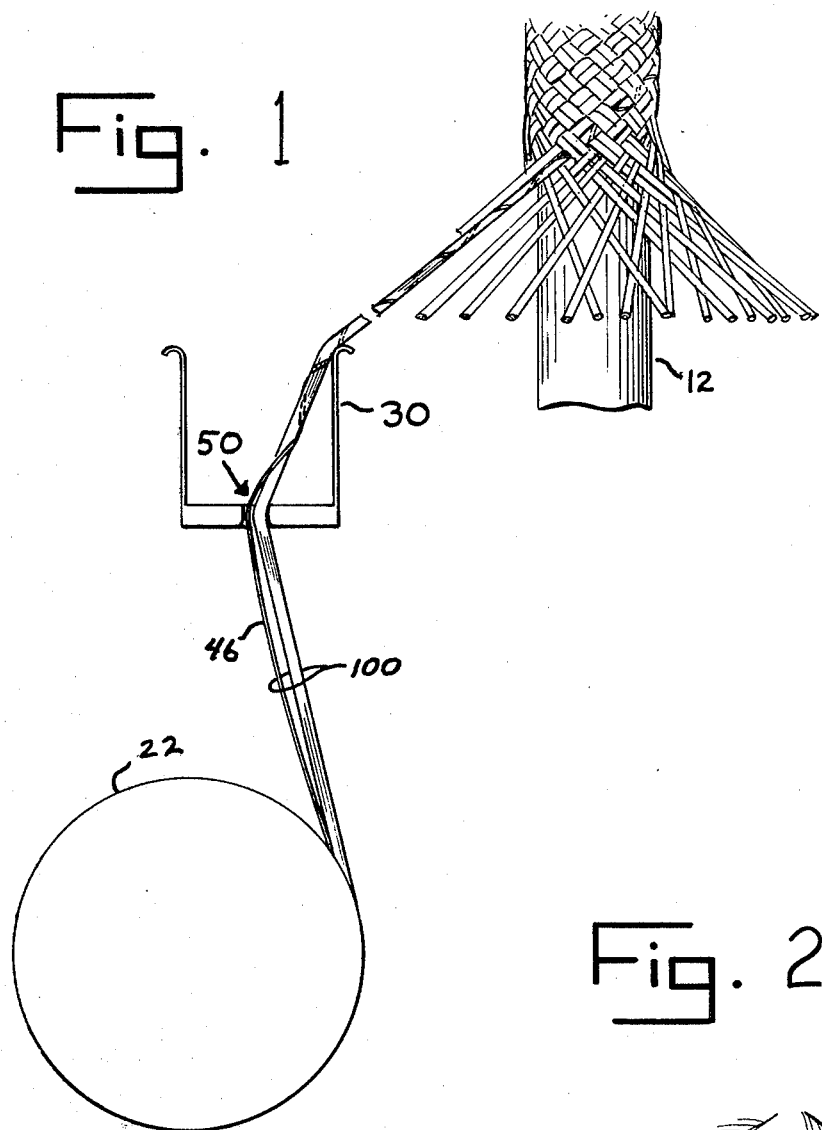

BRAIDED-WIRE SHEATHING HAVING BUNDLED STRANDS TWISTED TO EQUALIZE TENSION

This is a continuation of application Ser. No. 861,264, filed Dec. 16, 1977, now abandoned, which is a division of application Ser. No. 676,940, filed Apr. 14, 1976, now U.S. Pat. No. 4,092,897, issued June 6, 1978.

BACKGROUND OF THE INVENTION

This invention relates to wire braiding.

In the manufacture of a variety of products, such as shielded electrical cable and flexible hydraulic and pneumatic hosing, wire is tightly woven over a tubular core to form a braided sheath. The wire strands are typically wound on supply bobbins which are driven along sinuous paths in opposing directions around the tubing, passing over and under one another to lay the wire in an interlaced woven pattern over the surface of the tubing. Each supply bobbin is mounted on a carrier which pays out the wire under controlled tension during braiding.

The wire is often wound on the bobbins, and payed out, in multi-strand bundles. Since the wire strands within each bundle are not of precisely the same length, the shorter strands are placed under greater tension during the braiding operation and stretch slightly until the lengths of the strands are equalized. When textile filaments or "soft" wire is braided, considerable elongation under tension is permissible, and tension alone works well to compensate for variations in length among the bundled strands.

However, in the construction of certain products, such as hydraulic hose, it is essential to use "hard" wires having great tensile strength. It is the strength of braided-wire sheath which permits the hose to handle high pressure without bursting. Because hard wire can be stretched very little, even under great tension, braiding tension alone does not adequately eliminate length variations, and the consequent poor distribution of load among the bundled strands significantly reduces the pressure-handling capability of the braided sheath.

It is accordingly the principal object of the present invention to increase the strength and endurance of braided-wire sheath.

In accordance with the invention, the distribution of tension among the bundled strands of high-tensile-strength wire is continually equalized during braiding by wrapping the slack strands, which are under lesser tension, about the remaining strands which are under eater tension.

... accordance with the invention, the longer wires under less tension are positioned at the outside of the twisted grouping where they are helically wound around the shorter wires which are under greater tension. A preferred braiding pattern employs adjacent pairs of bundles woven in a two-over, two-under weave. By twisting the adjacent bundles in each of the pairs in opposite directions, one clockwise and the other counterclockwise, the parallel combination is balanced and any tendency to produce a net twisting force to the tubing covered by the braided sheath is eliminated.

A more detailed description of the method and apparatus for weaving the braided-wire sheathing contemplated by the present invention is presented in the aforementioned U.S. Pat. No. 4,092,897, the disclosure of which is incorporated herein by reference and briefly summarized below.

BRIEF DESCRIPTION OF THE DRAWINGS

FIG. 1 illustrates the manner in which a braided sheath comprising interwoven bundles of high tensile strength wire is braided such that longer wires in each of the bundles are twisted helically about the shorter wires such that all of the wires in each of the bundles are placed under substantially equal tension; and FIG. 2 illustrates a preferred braiding pattern for the braided sheath of a high pressure hose wherein the interwoven bundles are grouped in pairs woven in a two-over, two-under pattern, the two bundles in each pair being twisted in opposing rotational directions.

SUMMARY DESCRIPTION

FIG. 1 illustrates the manner in which the high pressure hose comprising a braided sheath wound over the hollow tubular core 12 is formed by passing each bundled collection of wires paid out from a supply (illustrated by the bobbin 22) through a twisting slot, indicated at 50, in the twisting member 30. As seen in FIGS. 1 and 2, the longer, slack wire indicated at 46 is twisted helically about the remainder of the wires in the bundle 100 in order to equalize the tension among the wires. The degree of twisting shown in FIGS. 1 and 2 has been exaggerated for purposes of illustration.

The cross-sectional area of the slot 50 exceeds that of the bundled collection of wires passing through it, thus allowing the wires to realign themselves or "tumble" within the slot as it rotates. Those wires within the bundled collection which are under lesser tension are hence moved to outer positions within the slot. The net effect is that the longer wires being under less tension are moved to the outside of the twisted grouping where they are helically wound around the shorter wires which are under greater tension.

As noted earlier, a preferred braiding pattern employs adjacent pairs of bundles woven in a "two-over, two-under" weave. By twisting the adjacent pairs in opposite directions, one clockwise and the other counterclockwise, the parallel combination is "balanced" and any tendency to produce a net twisting force to the tubing is eliminated.

The wires within the bundle need not be of the same size. An enlarged core wire may be employed, smaller "slack" wires being wrapped around the core by the twisting slot while small wires under greater tension tend to travel parallel with the core wire, thereby equalizing tension and length for improved load distribution within the bundled collection of wires.

What is claimed is:

1. High pressure hose comprising a braided sheath woven over a hollow tubular core, said sheath comprising interwoven bundles of high tensile strength wire, each of said bundles comprising a plurality of continuous wires of differing lengths, each of said wires being a continuous strand from one end of said bundle to the other, the longer wires in each of said bundles being twisted about the shorter wires such that all of the wires in each of said bundles are woven about said core under equal tension.

2. High pressure hose as set forth in claim 1 where some of said bundles are twisted in a first rotational direction while the remainder of said bundles are twisted in the opposite rotational direction.

3. High pressure hose as set forth in claim 2 wherein said bundles are grouped in pairs woven in a two-under, two-over pattern, and wherein the two bundles in each such pair are twisted in opposing rotational directions.

* * * * *